United States Patent [19]

Iizumi et al.

[11] Patent Number: 4,847,704

[45] Date of Patent: Jul. 11, 1989

[54] DISK DRIVING DEVICE

[75] Inventors: Tomoo Iizumi, Furukawa; Tooru Kaneko, Miyagi, both of Japan

[73] Assignee: Alps Electric Co., Ltd., Japan

[21] Appl. No.: 106,558

[22] Filed: Oct. 6, 1987

[30] Foreign Application Priority Data

Dec. 29, 1986 [JP] Japan ................................. 61-315834

[51] Int. Cl.$^4$ ........................ G11B 5/09; G11B 15/04
[52] U.S. Cl. ....................................... 360/48; 360/60
[58] Field of Search ................................. 360/47–49, 360/77, 78, 60

[56] References Cited

U.S. PATENT DOCUMENTS 4,122,503 10/1978 Allan .
4,554,598 11/1985 Tarbox et al. ....................... 360/48
4,622,602 11/1986 Kutaragi .
4,636,884 1/1987 Hattori et al. ....................... 360/78
4,651,237 3/1987 Williams .

*Primary Examiner*—Vincent P. Canney
*Attorney, Agent, or Firm*—Guy W. Shoup; Paul J. Winters; Stephen L. Malaska

[57] ABSTRACT

A disk driving device includes a rotatably driven information recording disk having multiple recording surfaces. At least two recording surfaces among them are provided with mutually related regions originally assigned with identical signals and mutually related regions originally assigned with different signals. These signals are detected by a head assembly and subsequently compared to each other to specify a region in which the head assembly is located.

2 Claims, 8 Drawing Sheets

DISK DRIVING DEVICE

FIELD OF THE INVENTION

This invention relates to a disk driving device configured to drive an information recording disk consisting of a disk-shaped base plate and information recording layers provided on surfaces thereof to effect information recording or reproduction.

BACKGROUND OF THE INVENTION

There are known various forms of disk driving devices configured to record and/or reproduce information by rotating a magnetic recording medium in the form of a disk (hereinafter called a magnetic disk, for example.) Among others, a disk driving device also called "hard disk device" is particularly used in a small-scaled, large-capacity system. Such a hard disk device is configured to rotate at a high revolution a magnetic disks each made of a disk-shaped hard material having magnetic recording layers on surfaces thereof, and magnetic heads are opposed to the surface of the magnetic disk to record or reproduce signals thereon.

FIG. 9 shows one form of the disk driving device of this type. The disk driving device generally comprises magnetic disks 1 on which information is recorded, magnetic heads 2 which record or reproduce information on or from the magnetic disk 1, a direct drive motor (not shown. Hereinafter called "DD motor") which drives the magnetic disks 1, a head driving mechanism 4 which moves the magnetic heads 2 to predetermined tracks on the magnetic disks 1, a support board 5 which supports a housing sealingly accepting therein the magnetic disks 1, the magnetic heads 2 and other members, a printed board 6 on which a motor driving circuit, control circuit, etc. are printed, and a frame (not shown) which holds the printed board 6 on the support board 5.

The illustrated magnetic disk device includes two magnetic disks 1. Each magnetic disk 1 has two recording surfaces on opposite planar surfaces thereof. Therefore, the illustrated disk mechanism includes four magnetic heads 2 associated with respective recording surfaces of the magnetic disks 1. The magnetic heads are mounted on a swing arm 8 of the head driving mechanism 4 by cantilever springs. The head driving mechanism 4 consists of the swing arm 8, a steel belt 9 mounted on a part of the swing arm 8, a pulley 10 on which an intermediate portion of the steel belt engages, and a stepping motor 11 which has a drive shaft 12 supporting the pulley 10 combined with the steel belt 9, so that when the stepping motor 11 is driven, the swing arm 8 swings about a pivot pin 8a thereof.

The magnetic disks 1, magnetic heads 2, swing arm 8, steel belt 9 and pulley 10 are accepted in the casing which consists of the support board 5 and a top cover (ot shown). To establish an airtight sealing of the housing, gaskets are used at the contact between the support board 5 and the top cover and at the mounting portion of the stepping motor 11. Further, magnetic fluid is applied around the shaft of the DD motor for the same purpose. The swing arm 8 is provided with a shutter 17 extending outwardly away from the magnetic heads 2. Nearer to an airtight chamber of the support board 5 is provided a photo interrupter 18 serving as an outside sensor. The photo interrupter 18 defines an insertion path 18a which receives the shutter 17 loosely. In the prior art arrangement, when a magnetic head 2 reaches a zero track position at an outermost circumference, the shutter 17 blocks the light path provided in the insertion path 18a of the photo interrupter 18.

In the arrangement using the stepping motor 11 to transport the magnetic heads 2, head positioning is difficult when the track density of the disks is increased. More specifically, since different materials in the hard disk apparatus have different expansion coefficients, there occurs a problem called "thermal off-track" in which the position of the magnetic head 2 relative to the tracks varies with temperature. Therefore, in a 5.25 inch-type hard disk apparatus, it is difficult to precisely position the magnetic heads 2 beyond 400TPI unless a servo system is used.

U.S. Pat. No. Re. 32,075 discloses an invention of a servo-control system. The system uses a data-masked servo sector including track center line servo-control data detected by a head to fix the position of the head according to one piece of servo information per one revolution of a magnetic disk. Since this servo-control system invites a decrease in the data recording length by an amount corresponding to the servo information, it is configured to slightly slow down the revolution to adjust the head transport speed. This arrangement, however, may invite an instable movement of the head and may increase the error rate. Additionally, since only one piece of servo information is provided in one cycle, it takes a time to detect the servo information after movement of the head.

U.S. Pat. No. 4,122,503 discloses another control system using a servo system in which the inner-most and outer-most tracks are used as particular servo tracks. This system is called "ID-OD system" in abbreviation of "inner diameter" and "outer diameter". In this system, the disk apparatus is conofigured to first read the outer servo track and effect fine adjustment to place the head at the center of the track. Subsequently, the head is moved toward the inner servo track. In this operation, step pulses of the stepping motor in the head driving mechanism are counted, so that when the head reaches the inner servo track, the head positioning mechanism effects precise positioning to bring the head at the center of the track. While the precise positioning is effected for each servo track, the positioning mechanism is informed of a correction amount necessary for finding the center of the track. Obtaining the correction amount, the positioning mechanism is enabled to calibrate precise positions of respective tracks according to information about the number of step pulses required for movement between the outer and inner tracks and the fine step correction amount required in each servo track.

Further, the magnetic disk apparatus records information by saturation recording.

Saturation recording 2 is such that the current applied to each head for its information writing is larger than a current value which saturates the magnetization of the magnetized layer of the magnetic disk in one direction. The saturation recording features in that new information can be written by "over-writing" which does not require erasure of old information on the disk before writing the new information. This simplifies the head construction and enables an instantaneous change-over between reading and writing operations. Therefore, a single track may be divided into multiple sectors so that reading and writing may be effected per each sector, and this contributes to the maximum use of the recording surfaces without loss.

In order to write or read information on a magnetic disk, it is necessary to make a format in an information recording region on the magnetic disk. The format may be a known format called "floppy-like" format, for example, in which one cycle from first to fourth gap is divided into 32 sectors related to an exterior index signal EIN.

The exterior index signal EIN corresponding to the first gap is settled at a position where a predetermined count number is detected from detection of a first interior index signal IN1 which is supplied from a Hall element or other magnetic detecting means upon detection of the rotational position of a pulse generating magnet 40 attached to a rotor of the DD motor 3. That is, when the said count number is detected after detection of the interior index signal IN1, the exterior index signal EIN is applied to the host computer 26, and this position is regarded as the beginning of the recording track T.

Such a format is usually formed in the recording regions except those having servo information thereon before shipment of the system, and a formatting is effected by an end user when he first uses the magnetic disk driving device having the magnetic disk therein to enable information writing in the data field of the format.

In an ID-OD or other system in which servo information is provided in limited tracks alone, positional control of the head is effected based on the servo information which is written in a relationship with exciting phases of a stepping motor or other device for transporting the magnetic head. Therefore, if the stepping motor mis-steps for any reason, it sometimes occurs that the formatting is written, erasing the servo information. If the formatting is once written on the servo information, the system cannot obtain the servo information thereafter, and cannot position the head accurately.

Further, disk driving devices known heretofore are configured to detect the zero track of a magnetic disk, using a sensor or other mechanical means, or alternatively using a particular signal specifically written in the radial direction for zero track detection to unable rewriting in the region having the particular signal.

However, the use of such a mechanical means invites an increase of the manufacturing cost of the system because of an additional cost not only for the sensor or other part itself but also for a more difficult assembling process caused by more complicated zero track positional adjustment. The use of the particular signal to unable rewriting thereon necessarily requires a slow-down of the disk rotation to adjust the transporting speed, and this causes an instability of the head assembly and an increase of the error rate. This problem also remains in the aforegoing U.S. Pat. No. Re. 32,075.

OBJECT OF THE INVENTION

It is therefore an object of the invention to provide a disk driving device having an information recording disk from which the servo information is never erased during formatting.

A further object of the invention is to provide a disk driving device having an information recording disk enabling zero track detection without using a sensor nor particular signal for zero track detection.

A still further object of the invention is to provide a head position detecting method in which the servo information or other important information is never erased by over-writing on write protect regions, and in which the position of the head assembly on an information recording disk is detected by an electrical means alone without slowing down the rotation speed of the information recording disk.

SUMMARY OF THE INVENTION

According to one aspect of the invention, there is provided a disk driving device including a rotationally driven information recording disk made from a disk-shaped base plate and an information recording layer coated on a surface of the base plate for writing or rewriting information thereon, the disk having tracks concentrically aligned about the rotation axis. The driving device also and including a head assembly configured to trace said tracks to write or read information thereon, at least two recording areas among multiple recording areas formed with said information recording layer of the information recording disk including mutually related regions originally assigned with identical signals and mutually related regions originally assigned with different signals. The signal assignment involves signal erasure, and it is merely required to specify a particular region on the recording surfaces.

With this arrangement, the signals assigned to respective tracks in the mutually related regions (which may be identical in configuration) on two surfaces can be read by the head assembly, and the signals applied to the same cylinder are compared to each other so that the region in which the head assembly is located is readily specified. Therefore, any region to be protected against information writing can be discriminated by an electrical means in lieu of a mechanical means.

BRIEF DESCRIPTION OF THE DRAWINGS

FIGS. 1 through 8 are views for explanation of an embodiment of the invention in which:

FIG. 3 is a block diagram showing a control system in a disk driving device according to the embodiment;

FIG. 4 is an explanatory view showing recording tracks and a configuration of written servo information of side "1" of the magnetic disk;

FIG. 5 is a block diagram of a servo circuit;

FIG. 6 is a bottom view of the disk driving device for explanation of index detection;

FIG. 7 is a flow chart of a seek control of the disk driving device; and

FIG. 8 is a flow chart of a process of zero track restoration.

DETAILED DESCRIPTION

Figure 1A:
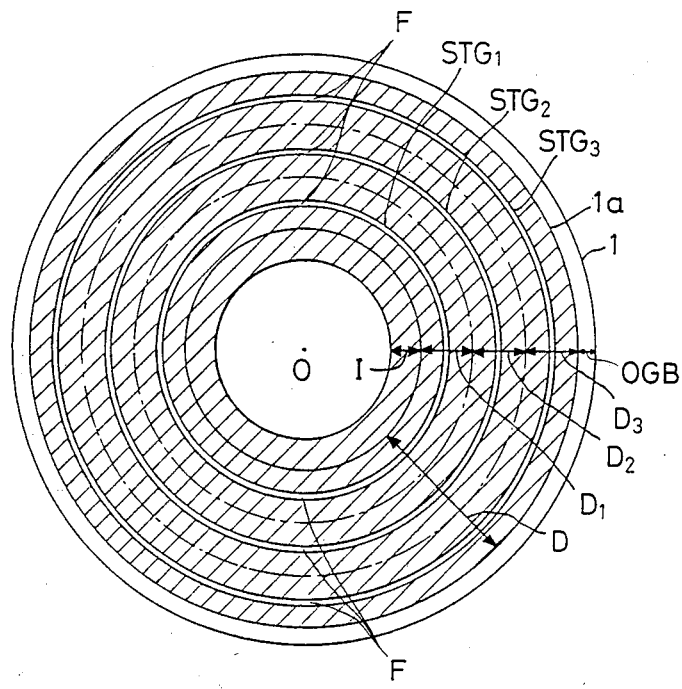
FIG. 1(a) is an explanatory view showing regions of side "1" of a magnetic disk.
Figure 1B:
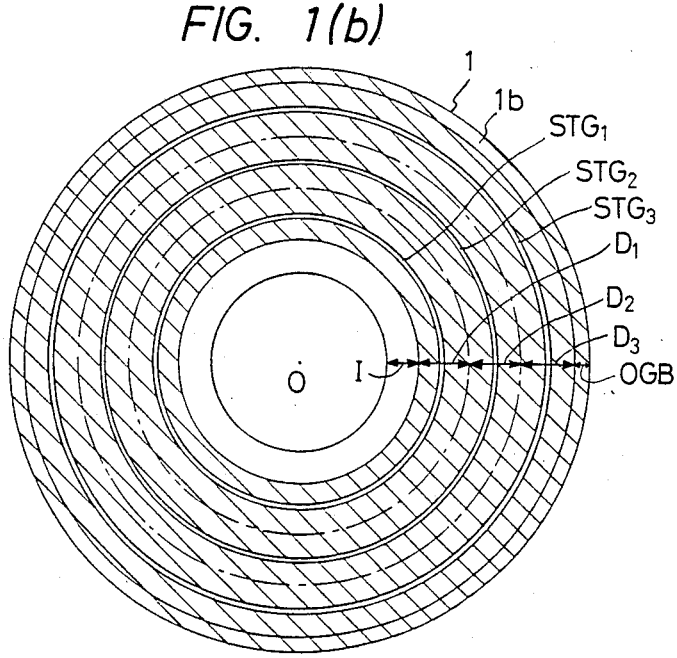
FIG. 1(b) is an explanatory view showing regions of side "0" of the magnetic disk.
Figures 2A, 2B:
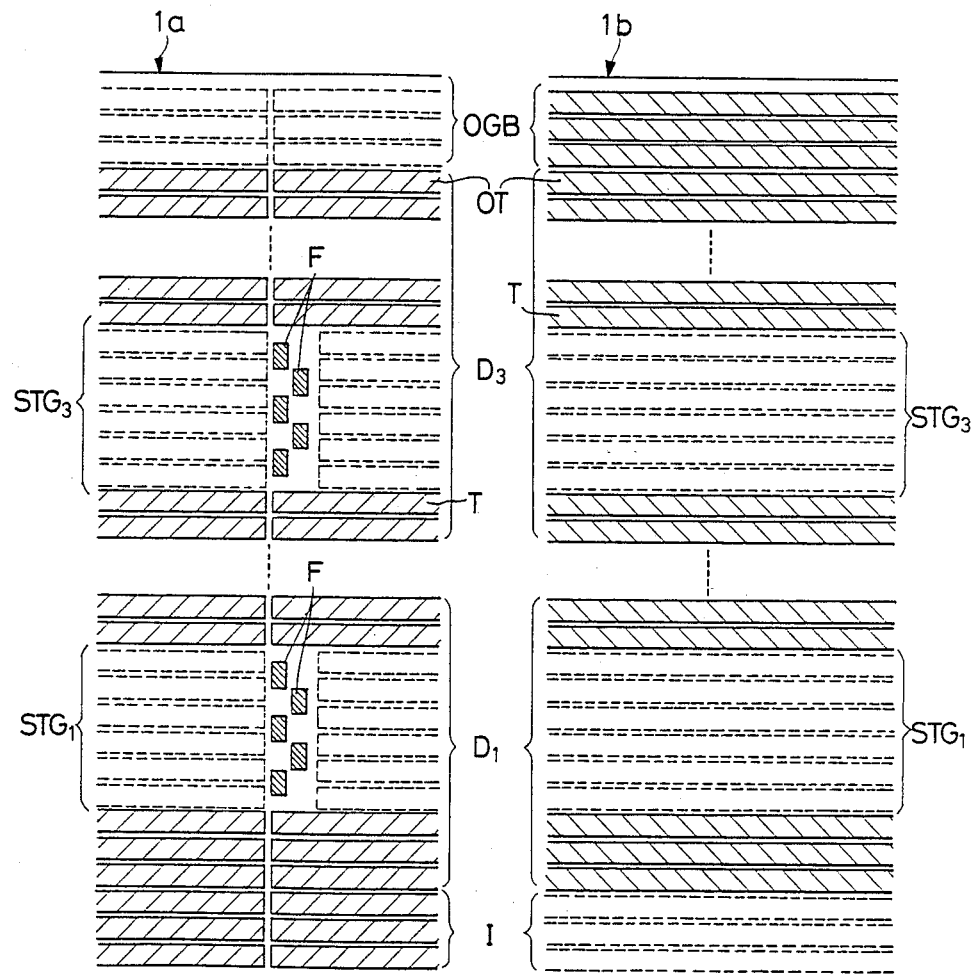
FIG. 2(a) is an explanatory view showing a detail of side "1" of the magnetic disk.
FIG. 2(b) is an explanatory view showing a detail of side "0" of the magnetic disk.
Figure 3:
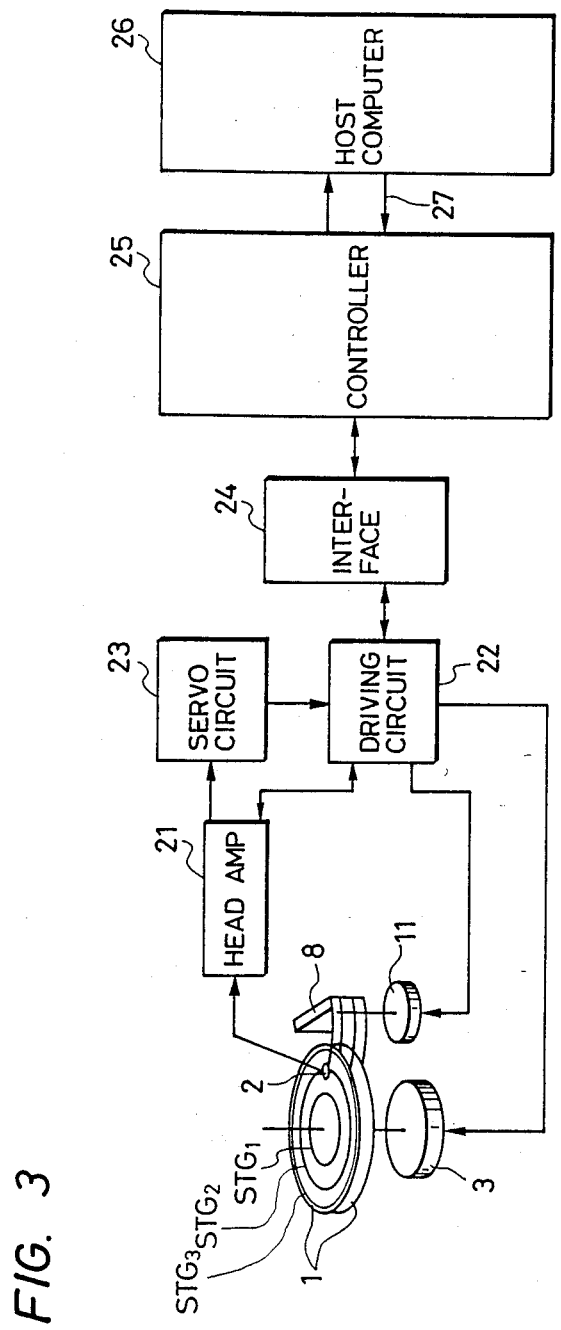
Figure 4:
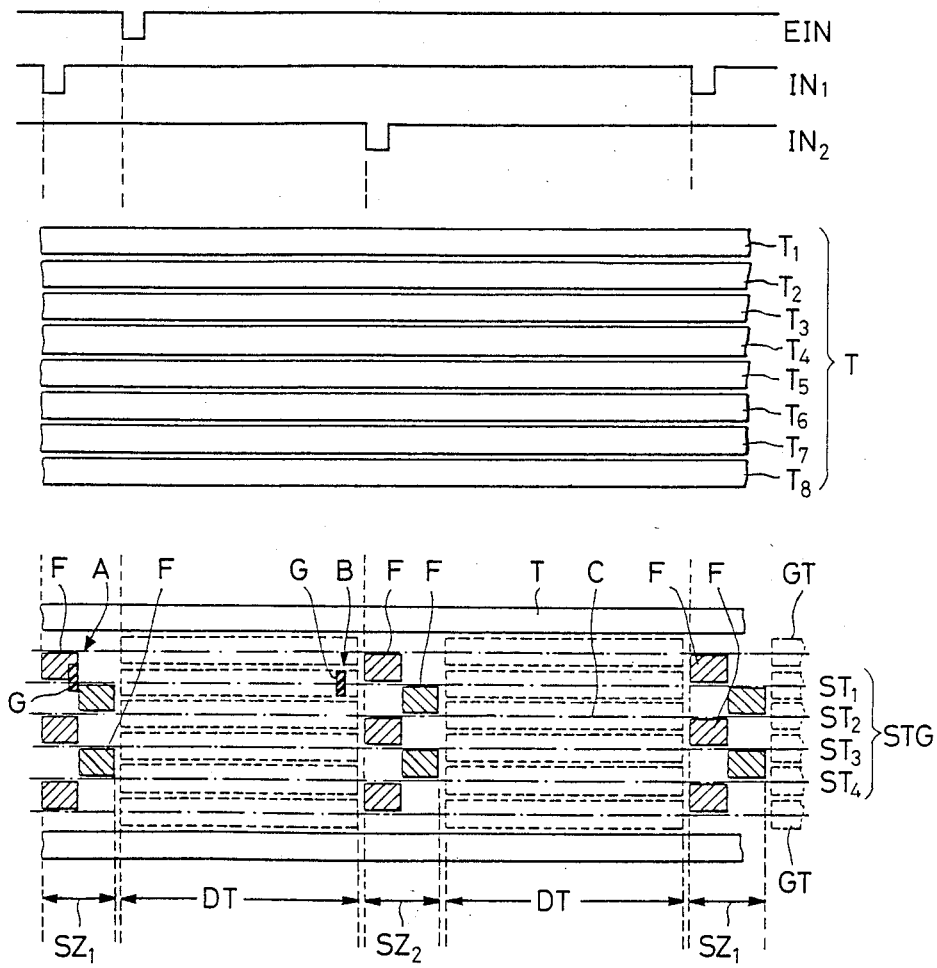
Figure 5:
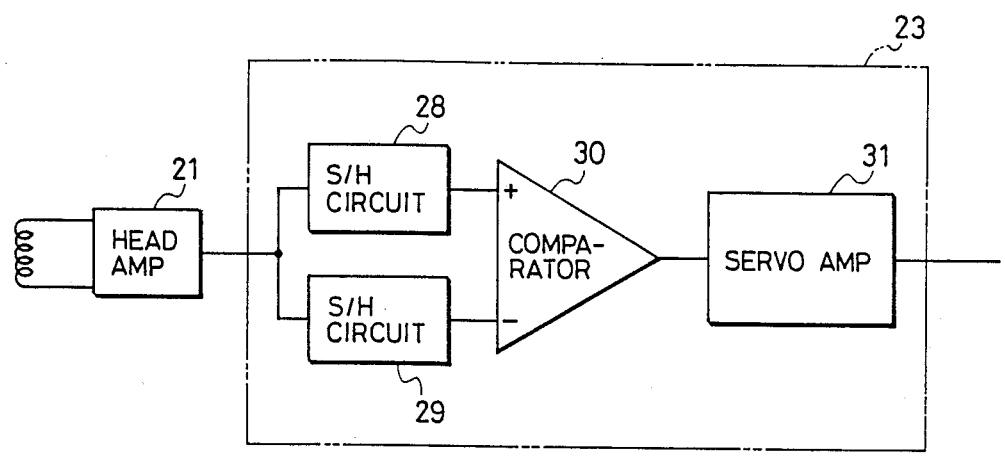
Figure 6:
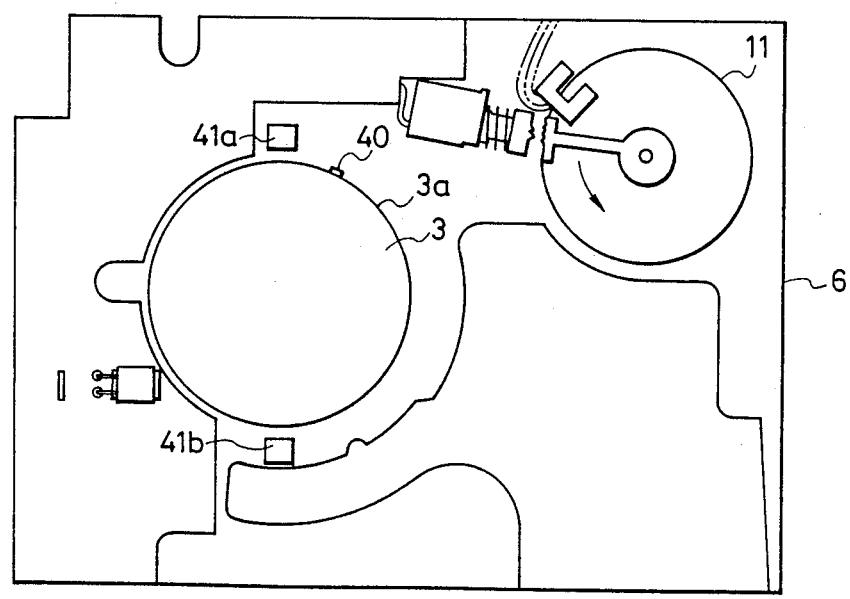
Figure 7:
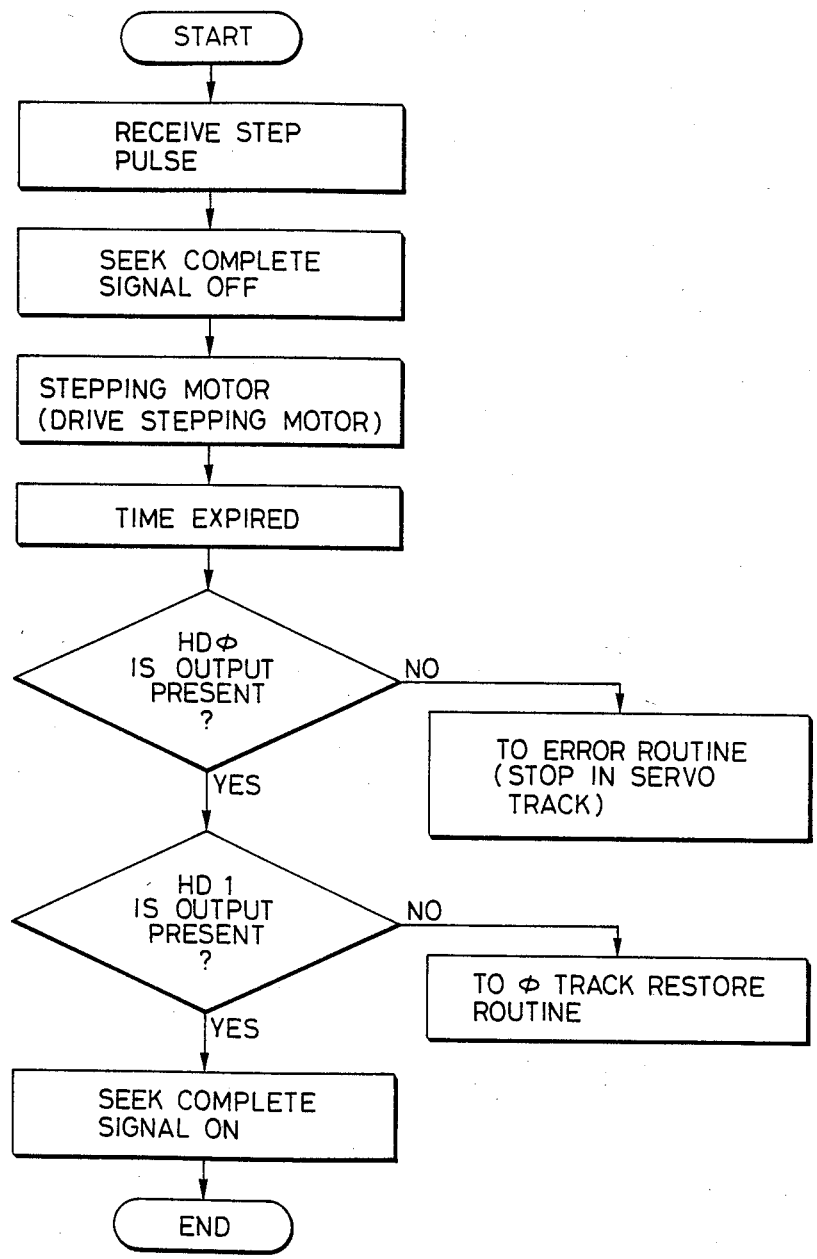
Figure 8:
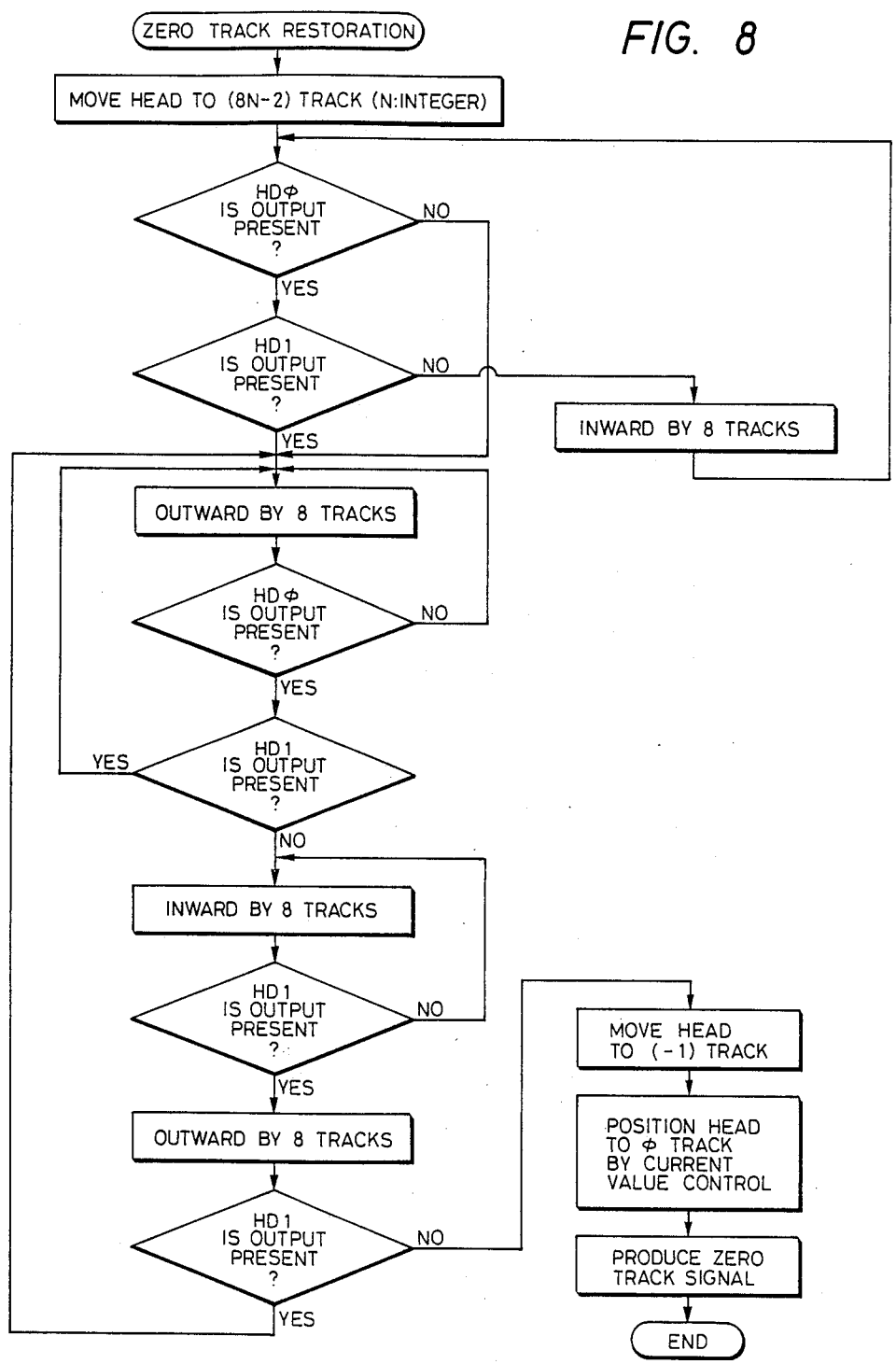
Figure 9:
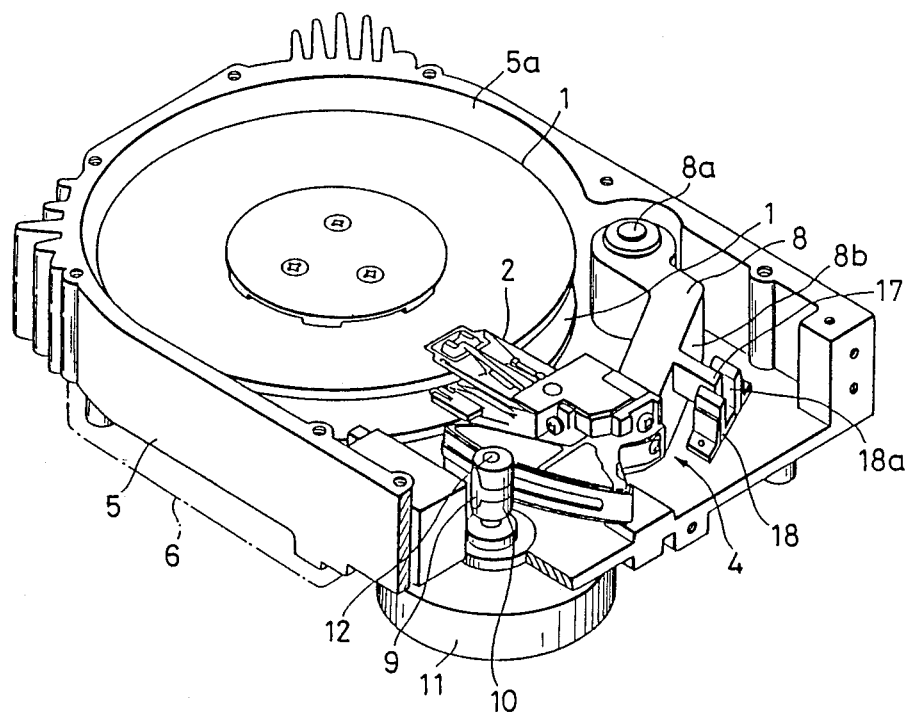
FIG. 9 is a fragmentary perspective view of a prior art disk driving device which is partly cut out to expose its interior structure.

The invention is hereinbelow described in detail, referring to a preferred embodiment illustrated in the drawings. FIGS. 1 through 8 are views for explanation of an embodiment of the invention, in which FIGS. 1(a) and 1(b) are explanatory views showing regions on a magnetic disk related to the embodiment; FIGS. 2(a) and 2(b) are explanatory views showing details of the regions of FIG. 1; FIG. 3 is a block diagram showing a control system of a disk driving device according to the embodiment; FIG. 4 is an explanatory view showing recording tracks on a magnetic disk and a configuration of written servo signals; FIG. 5 is a block diagram of a servo circuit; FIG. 6 is a bottom view of a disk driving device for explanation of its index detection; FIG. 7 is a flow chart showing a seek control of the disk driving device, and FIG. 8 is a flow chart showing a zero track restoration employed in the disk driving device. The disk driving device itself is identical to the prior art system of FIG. 9, and some members which are or may be regarded to be substantially equal to those of the prior art system are designated by the same reference numerals.

In FIG. 3, the control system of the disk driving device controls a DD motor 3 for rotating a magnetic disk 1 and controls a stepping motor 11 for swinging a swing arm 8. The control system comprises a driving circuit 22 for signal transmission and reception with respect to a head amplifier 21, a servo circuit 23 which processes servo information detected by the magnetic head 2 and amplified by the head amplifier 21 to supply the driving circuit 22 with an electric signal concerning servo control, and a controller 25 which controls the driving circuit 22 via an interface 24. The controller 25 is connected to a host computer 26 by a bass 27 to enable signal processing of a signal detected by the magnetic head 2 or a signal to be transmitted to the magnetic head 2.

FIGS. 1 and 2 shows various areas provided on the magnetic disk 1. The magnetic disk 1 may be made from an aluminum plate having a magnetic coating. The magnetic disk 1 has an inhibit zone I and a data zone D. The inhibit zone I is located at a radially inner-most position of the magnetic disk 1, and no data is written on it. The data zone D is located at a radially outer position of the inhibit zone I and has about six hundred recording tracks T aligned concentrically. The data zone D is divided into three regions D1, D2 and D3 each having in a central portion thereof a group of servo tracks STG1 (STG2 or STG3) in which four tracks as shown in FIGS. 2(a) and 4 form one group. In the servo track groups STG1 through STG3, servo zones SZ1 and SZ2 are provided on which servo signals F are written as servo information at 180 degrees interval.

FIG. 4 shows the servo track group STG1. In the same drawings, the servo track group STG1 includes four servo tracks ST1, ST2, ST3 and ST4 on each of which the servo signal F is written alternatingly at a uniform frequency and in a zigzag configuration at positions equally distant from a center line C in the length (circumferential) direction, in a relationship with first and second interior index signals IN1 and IN2. They serve as the aforegoing servo zones SZ1 and SZ2. In this case, since the servo signals F are written by a single magnetic head 2, the widths of the servo signals F, recording tracks T and servo tracks ST1 through ST4 coincide with the length of a gap G of the magnetic head 2. An off-track phenomenum occurs when the position of the gap G of the magnetic head 2 deviates from a desired recording track T.

In this embodiment, 180 degrees phase difference is provided between the servo zones SZ1 and SZ2, considering the time required for positional correction of the magnetic head 2 and the time required for one revolution of the magnetic disk 1. More specifically, the time required for one revolution of the magnetic disk 1 is about 16.67msec at 3600rpm, and the time from energization to deenergization of the stepping motor 11 is about 8msec. Therefore, with the 180-degree phase difference in the servo zones, it is possible to correct the position of the magnetic head by detecting the servo signal F in the servo zone SZ1 associated with the first interior index signal IN1, for example, and immediately after the termination of the correcting operation, it is possible to confirm whether the correcting operation is adequate or not, by detecting the servo signal F in the servo zone SZ2 associated with the second interior index signal IN2. In this case, since the time for one revolution of the magnetic disk 1 has the aforegoing relationship with the energized duration of the stepping motor 11, two servo zones are provided in one cycle at 180 degrees interval. However, according to an employed type of stepping motor or other driving motor and an employed type of recording medium, they may be modified, considering the time taken for the positioning motion by the motor and the revolution of the recording medium. Whatever motor or recording medium is employed, the system will sufficiently function with one to several servo zones per cycle.

Further, in the disk driving device, since the servo zones SZ1 and SZ2 are formed at 180 degree intervals, the same phase difference is also required in the first and second interior index signals IN1 and IN2. In this connection, as shown in FIG. 6, for example, a magnet 40 (hereinafter called "PG magnet") serving as a pulse generating means is provided at an outer circumferential portion of a rotor 3a of the DD motor 3, so that a magnetic change in the PG magnet 40 is detected by coils, Hall elements, or other detecting means 41a and 41b (hereinafter called "PG sensor"). For example, the detecting, means 41a, 41b may be provided near the outer circumferential portion of a rotor 3a of the DD motor 3 and symmetrically opposed to each other about the rotation axis of the DD motor 3, in order to use detection pulses as the first and second interior index signals IN1 and IN2.

Four servo tracks form one group for the reason explained below.

In the stepping motor 11, individual rotation angles are not completely uniform due to presence of differences in distances between magnetic pole teeth or between magnetized portions of the rotor. Therefore, when a stepping motor of a four-phase unipolar type or two-phase bipolar type is used, one cycle is established by eight steps totaling four steps in one-phase excitation and four steps in two-phase excitation. It is recognized that errors in the rotation angles by the exciting phases in individual half revolutions exhibit a uniform pattern. Therefore, by configuring to correct the rotation angles of four tracks in a half cycle, maintaining a close relationship between the rotation angle and an exciting voltage, the same control factor also applies to every other four recording tracks.

FIG. 4 also shows guard tracks GT provided radially inward and outward of the servo track group STG1. Individual guard tracks GT and servo tracks ST1 through ST4 include dummy tracks DT having no servo signal F recorded thereon and never used as a data region. In FIG. 4, reference symbol EIN denotes an exterior index signal. When the first index signal IN1 is detected, as described above, counting is commenced, and when a predetermined counting number is detected, the exterior index signal EIN is transmitted to the host computer 26. The exterior index signal EIN is used as an index for writing or reading on the recording tracks T in the data zone D.

Radially outside the data zone D, i.e. in the radially outer position on the zero track 0T located at the outermost circumference of the data region D3 is provided an outer guard band OGB on which no data is written, i.e. no inverse-magnetized region is formed. Therefore, the magnetic disk 1 is divided into five annular regions of inner guard band I, first data region D1, second data region D2, third data region D3 and outer guard band OGB in this sequence from the center thereof. Further, the servo regions STG1, STG2 and STG3 occupy central annular portions of the data regions D1, D2 and D3, respectively. All these regions are concentrical about the center 0 of the magnetic disk 1. Among them, the servo regions STG1, STG2 and STG3 and the outer guard band OGB are write protect regions whereas the first, second and third data zones D1, D2 and D3 are read/write regions on which information is recorded. Since the inner guard band I does not require write-protection not used to read or write signals, it is clearly distinguished from the write protect regions if some signal is written thereon.

The regions not having servo signal F written thereon among the servo regions STG1, STG2 and STG3 and the outer guard band OGB are originally DC-erased as being write-protect regions, and inverse magnetization is not formed thereon on one recording surface 1a, e.g. side "1" of the magnetic disk as shown in FIGS. 1(a) and 2(a).

In contrast, in the data regions D1, D2 and D3 which is the read/write region excluding the servo regions STG1, STG2 and STG3 and the inner guard band I, predetermined signals are originally written, and inverse magnetized regions are formed continuously.

On the other hand, at least one recording surface 1b, e.g. side "0" of the magnetic disk 1 is divided into identical regions as those of the recording surface 1a as shown in FIGS. 1(b) and 2(b), and no servo signal F nor other signal is written in the servo regions STG1, STG2 and STG3 nor in the inner guard band I whereas some signal is written in the data regions D1, D2 and D3 and in the outer guard band OGB. The signal written on the recording surface 1b corresponding to side "0" may be identical, i.e. identical in frequency to that written on the recording surface 1a corresponding to side "1", or alternatively, it may be different, i.e. different in frequency from same.

TABLE 1

| PRESENCE OR ABSENCE OF DATA ON REGIONS | | |
|---|---|---|
| | Side "1" (1a) | |
| side "0" (1b) | PRESENCE OR ABSENCE OF DATA | PRESENT | ABSENT |
| | PRESENT | DATA ZONE | OGB |
| | ABSENT | I | SERVO REGION |

Therefore, when the signal-written regions are selected in the aforegoing fashion, these regions are clearly distinguished by detecting the relationship between the recording surface 1a of side "1" and the recording surface 1b of side "0" regarding presence or absence of data as shown in Table 1. If the disk driving device is configured to a drive two-disk arrangement, side "0", side "2" and side "3" may be used as the recording surfaces 1b so as to use side "1" alone as the recording surface 1a.

With this arrangement, the disk driving system operates as follows.

This type of disk driving system exhibits a relatively large temperature variation between its dormant and activated conditions. The magnetic disk 1 is thermally expanded with time after power supply to the disk driving device, and the thermal expansion causes a thermal off-track. The amount of expansion gradually increases soon after the power supply, and reaches a substantially constant value in 35 minutes approximately.

In this connection, just after power is entered in the disk driving device, the magnetic head 2 first scans the surface of the magnetic disk 1 to memorize in the RAM of the driving circuit 22, the electrical amount concerning exciting phases of the stepping motor 11 corresponding to respective recording tracks T, and thereby makes the RAM table. Additionally, a positioning correction system considering an increase of the temperature is originally stored in a microcomputer so that recording or reproduction is performed in accordance with the servo algorithm stored in the microcomputer. More specifically, if the microcomputer gives the driving circuit 22 a servo instruction based on the aforegoing servo algorithm while recording or reproducing a desired recording track by energization of a predetermined exciting phase indicated by the RAM table, the magnetic head 2 is moved from a recording track T1 (or T5) for example, to a servo track ST1 of FIG. 4, for example, in the same exciting phase as the recording track T1 (T5) and in a servo zone ST. If the magnetic head 2 is heretofore located at the recording track T2 (T6), it is moved to the servo track ST2. Similarly, if the recording track is T3 (T7) or T4 (T8), the servo track will be ST3 or ST4, respectively. In this embodiment, one cycle of the stepping motor 11 consists of eight steps. Therefore, one servo zone has four tracks corresponding to the number of steps per half cycle of the stepping motor 11. When other form of the stepping motor 11 or other control system is employed, the number of servo tracks will be changed accordingly.

Assuming that the same exciting phase is energized by the same current value, and the gap G of the magnetic head 2 located at position A in FIG. 4 detects a servo signal F, a difference arises between the level of a precedingly detected servo signal and the level of a subsequently detected servo signal. In this connection, sample holding circuits 38 and 29 of the servo circuit 23 discriminate the signals, and a comparator 30 compares their signal levels. A servo amplifier 31 determines a current value for supply to the exciting phases of the stepping motor 11 in accordance with the comparison result to control the stepping motor 11 via the driving circuit 22. In this fashion, the gap G of the magnetic head 2 is moved to position B (FIG. 4) which is symmetrical about the center line 0, and the fine track position is fixed with respect to the servo track ST1.

Just after the movement of the magnetic head 2 is terminated, a servo signal F in the second servo zone SZ2 is detected for the aforegoing reason to judge in the second servo zone SZ2 whether the movement is adequate or not. More specifically, if an output from the comparator circuit 30 in the second servo zone SZ2 is lower than a predetermined level, the present movement condition is maintained. However, if the output is higher than the predetermined level, the stepping motor 11 is driven again to effect the same positional control to bring the magnetic head 2 to a precise track position, i.e. the fine track position.

A current value supplied to an exciting phase of the stepping motor 11 on arrival to the fine track position is stored in the RAM of the driving circuit 22, and the magnetic head 2 returns to its original track T1, referring to the aforegoing RAM table, so that the position of the gap G with respect to the recording track T1 is fixed by the current value stored in the RAM. In this fashion, the fine track position is established also in the recording track T1. In the disk driving device configured to effect such a servo correction, the DD motor 3 begins its rotation when power is entered, and the magnetic disk 1 rotates responsively. With this rotation, the magnetic head 2 floats at the inner-most inhibit zone I, moves to the outer-most zero track 0T to confirm the track position, and subsequently moves to the inputted recording track T.

At this time, there is a possibility that the stepping motor erroneously steps to the servo track ST which requires write-protection, and that the servo signal F is erased when a write signal is entered, so that servo correction is unabled thereafter. To avoid this, a control method as shown in the flow chart of FIG. 7 is employed.

More specifically, when the driving circuit 22 receives a step pulse from the host computer 26, the seek operation is turned off, and the stepping motor 1 is driven to activate the magnetic head 2 for its seeking operation. After the seeking operation is effected, it takes a certain time, i.e. a settling time for the magnetic head 2 to take a stable position in the target recording track T either in a buffer mode seeking or in a normal mode seeking. In this connection, it must be confirmed whether the time required at least for the settling has passed or not after the final step. Additionally, after it is confirmed that the settling has been completed or not, it is confirmed that the magnetic head 2 is located in the recording track T of the data regions D1, D2 and D3 or not. This is judged according to whether the magnetic head 2 has detected or not any signal from the recording surface 1b of side "0" of the magnetic disk 1. That is, it is effected by detecting presence or absence of an output from the head "0" associated with the recording surface 1b of side "0". In absence of an output from the recording surface 1b of side "0", it is meant that the magnetic head 2 is located in one of the servo regions STG1, STG2 and STG3 or in the inner guard band I as will beunderstood from FIGS. 1 and 2, and the system deems it to be a seek error and proceeds to an error routine. In the error routine, the magnetic head 2 is moved back to the zero track 0T and subsequently moved to the target track to repeat the seeking operation, for example. This treatment is appropriately performed according to a predetermined algorithm and according to the nature of the error.

In presence of an output from the magnetic head 2 on the recording surface 1b of side "0", it is deemed that the magnetic head 2 is located in one of the data regions D1, D2 and D3 or in the outer guard band OGB, and it is judged whether the magnetic head 2 has detected any signal from the recording surface 1a of side "1" of the magnetic disk 1. This is judged according to presence or absence of an output from the head "1" associated with the recording surface 1a of side "1". In absence of an output from the recording surface 1a of side "1", it is deemed that the magnetic head 2 is located in the outer guard band OGB as will be understood from FIGS. 1 and 2, and the system proceeds to a zero track restore routine (described later) to perform zero track restoration and subsequently seek the target track. In presence of an output from the head "1", it is meant that a magnetic inversion has occurred. Therefore, it is deemed that the magnetic head 2 has moved to the target track of the data regions D1, D2 and D3. That is, it is deemed that the magnetic head 2 has moved to the desired track without mis-step. Accordingly, a seek complete signal is turned on to perform desired reading or writing.

With this control method, the servo signal F is never erased from the servo tracks ST1 through ST4 while an end user performs formatting.

Therefore, if data is originally written on the recording track T of the data regions D1, D2 and D3, either signal including a formatting signal necessarily remains on the data regions D1, D2 and D3 after formatting, so that the aforegoing servo control is reliably effected after the formatting as well.

In the aforegoing embodiment, the servo signal F alone is written in the outer guard band OGB. Therefore, the zero track 0T can be detected by detecting the recording track position adjacent the inner-most circumference if the write-protect region having no signal thereon. A process of the zero track restoration is shown in FIG. 8 and briefly explained below.

In the described embodiment, the magnetic head 2 is driven by the stepping motor 11, regarding the position of a predetermined exciting phase as the zero track 0T. Since the stepping motor 11 has eight steps in one cycle as described above, zero track restoration is performed, regarding eight steps as one unit.

More specifically, when a zero track restoration instruction is entered in the driving circuit, an exciting phase of the stepping motor 11 corresponding to a track (8N−2 track. N is an integer.) located two tracks outer than an exciting phase corresponding to the zero track 0T is excited first, and it is judged whether an output is produced or not from the magnetic head "0" and the magnetic head "1" corresponding to the recording surface 1b of side "1" and the recording surface 1a of side "1" of the magnetic disk 1. At this time, if an output is detected from the head "0" but not from the head "1", it is considered that the magnetic head 2 is located in the outer guard band OGB. To confirm this, the magnetic head 2 is moved to seek inwardly by eight tracks and reliably positioned in the data region D3.

When an output is detected from both heads "0" and "1", it is deemed that the magnetic head 2 is located is one of the data regions D1, D2 and D3, and the head 2 is moved outwardly to seek every eight tracks, acknowledging outputs from the heads "0" and "1" in every eight tracks and finally located in the zero track 0T within one cycle of the stepping motor 11. At this time, since the exciting phase corresponding to the track (8N−2) alone is excited, the magnetic head 2 is located in the outer guard band OGB which is two tracks outer than the zero track 0T. In this fashion, after positional fixture in the zero track 0T within one cycle of the stepping motor 11, the exciting phase is changed to position the magnetic head 2 in the (−1) track which is one track outer than the zero track 0T. Subsequently, by exciting the exciting phase corresponding to the zero track 0T and controlling the current value to be supplied to the exciting phase, the magnetic head 2 is positioned in the zero track 0T. Upon completion of the positional fixture in the zero track 0T, a zero track signal is supplied to the controller to complete the zero track restoration.

In the zero track restoration, the magnetic head 2 is reliably precisely positioned within one cycle of the stepping motor 11 and brought to the zero track 0T by merely detecting an output from the heads "0" and "1", and it is not required to use information particularly written for the zero track restoration nor to use any mechanical detecting means.

The (8N−2) track is selected in the zero track restoration for the following reasons. That is, when the magentic head 2 is located in the outer guard band OGB, it takes the (−2) track position, and the nearer it is to the zero track 0T, the less mis-step occurs in the final step. Additionally, this contributes to a speed-up of zero track restoration.

If the (−1) track is selected, the head 2 may detect any undesired signal, and it is compelled to confirm presence or absence of signal after settling. Obviously, this slows down the speed of the zero track restoration.

As described above, the embodiment has the following advantages.

(1) The recording surfaces 1a and 1b of side "1" and side "0" of the magnetic disk 1 is divided into identical regions of the outer guard band OGB, data regions D1, D2, D3, servo regions STG1, STG2, STG3 and inner guard band I, so that these regions are readily identified by detecting signals written (or not written) in the respective regions. Therefore, if write-protection is established in the outer guard band OGB and in the servo regions STG1, STG2, STG3, information is never written in the write-protect regions and never erases the servo information.

(2) For the same reasons, the zero track position is reliably detected also in absence of a sensor or a particular signal written for the zero track detection.

(3) Since the servo signals F are not provided in the radial direction of the magnetic disk 1, the rotation speed of the magnetic disk 1 need not be slowed down, and this contributes to a stability of the magnetic head 2 and to a decrease in the error rate.

(4) If a mis-step occurs, it is not necessary to resume the positional correcting operation from its initial step as in the ID-OD system. Therefore, it ensures a significant time saving and an efficient operation.

(5) Since the head "1" alone of the magnetic head assembly 2 is used to detect the servo signal F, it is not necessary to change heads in the magnetic head assembly to detect the servo signal F as in the prior art system in which servo signals F are written in respective magnetic disks 1. Therefore, waiting time for settling after a head changeover is omitted, the servo control circuit is simplified, and the servo control time is reduced.

As described heretofore, according to the invention which prepares mutually related regions on at least two surfaces among multiple recording surfaces of an information recording disk and originally assigns signals to these regions, it is possible to discriminate these regions by detecting these signals. Therefore, write-protect regions can be clearly discriminated by an electrical means alone, and servo information originally written on the write protect regions are never erased by erroneous information writing. Further, since an originally written data can be used to detect the boundary between the write-protected outer guard band and the data region available for the read/write region, the zero track position which is the outer-most circumference of the data region is detected without using a particular sensor or other mechanical means or without originally writing a particular signal for zero track detection. Beside this, since any positional detection information or the like need not be originally written in the radial direction of the magnetic disk, it is not necessary to slow down the rotation speed of the information recording disk upon positional detection of the magnetic head, and the error rate in information recording or reproduction is significantly reduced.

What is claimed is:

1. In a disk driving device configured to rotate at least one information recording disk made from a disk-shaped base plate, said at least one information recording disk having a first recording surface and at least one other recording surface formed on a surface of the base plate for writing or rewriting information thereon so that a head assembly traces tracks on the recording surfaces to write or read signals thereon, an improvement wherein at least two of said recording surfaces are each provided with a read/write region for reading or writing data signals thereon and a write-protect region on which no data signal is written; said write-protect region having a servo region comprising a group of tracks having servo signals written thereon and an outer guard band consisting of a group of tracks having data signals written thereon located radially outside an outer-most track of said read/write region, wherein said servo signals are erased from said tracks of said servo regions of all except said first recording surface and wherein said data signals are erased from said tracks of said outer guard band of said first recording surface.

2. A head position detecting method comprising the steps of: selecting a first recording surface and at least one other recording surface among multiple recording surfaces of at least one information disk; sectioning at least two of said recording surfaces into a predetermined read/write region and a write-protect region, wherein said write-protect region includes a servo region including a group of tracks having data signals written thereon and an outer guard band consisting of a group of tracks having data signals written thereon located radially outside said read/write region; assigning predetermined signals including erasure signals to respective regions; erasing said servo signals from said tracks of said servo regions of all except said first recording surface; erasing said data signals from said tracks of said outer guard band of said first recording surface; reading said servo and said data signals from said first recording surface; reading said data signals from said at least one other recording surface; and comparing the signals read from said recording surfaces to each other in order to determine the region in which a head assembly is located.

* * * * *